US011928591B2

(12) United States Patent
Esaki et al.

(10) Patent No.: US 11,928,591 B2
(45) Date of Patent: Mar. 12, 2024

(54) INFORMATION PROCESSING APPARATUS AND INFORMATION PROCESSING METHOD

(71) Applicant: Hitachi, Ltd., Tokyo (JP)

(72) Inventors: Kanako Esaki, Tokyo (JP); Tadayuki Matsumura, Tokyo (JP); Hiroyuki Mizuno, Tokyo (JP); Kiyoto Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 495 days.

(21) Appl. No.: 17/181,435

(22) Filed: Feb. 22, 2021

(65) Prior Publication Data
US 2021/0271926 A1 Sep. 2, 2021

(30) Foreign Application Priority Data
Feb. 28, 2020 (JP) .................................. 2020-034348

(51) Int. Cl.
*G06N 3/08* (2023.01)
*G06F 18/20* (2023.01)
(Continued)

(52) U.S. Cl.
CPC ........... *G06N 3/08* (2013.01); *G06F 18/2413* (2023.01); *G06F 18/2415* (2023.01);
(Continued)

(58) Field of Classification Search
None
See application file for complete search history.

(56) References Cited

U.S. PATENT DOCUMENTS 10,229,190 B2 * 3/2019 Abbas ................. G06F 16/3346
10,290,040 B1 * 5/2019 Misra ....................... G06N 3/04
(Continued)

FOREIGN PATENT DOCUMENTS

JP         8-30327 A      2/1996

OTHER PUBLICATIONS

Taniguchi A, Taniguchi T, Cangelosi A. Cross-Situational Learning with Bayesian Generative Models for Multimodal Category and Word Learning in Robots. Front Neurorobot. Dec. 19, 2017;11:66. doi: 10.3389/fnbot.2017.00066. PMID: 29311888; PMCID: PMC5742219. (Year: 2017).*

*Primary Examiner* — Jiangeng Sun
(74) *Attorney, Agent, or Firm* — Crowell & Moring LLP

(57) ABSTRACT

An information processing apparatus and an information processing method capable of accurately recognizing an object to be sensed are provided.

One or a plurality of learning models are selected from among learning models corresponding to a plurality of categories, a priority of each of the selected learning models is set, observation data obtained by sequentially compounding pieces of sensor data applied from a sensor is analyzed using the learning model and the priority of the learning model, a setting of sensing at a next cycle is selected based on an analysis result, predetermined control processing is executed in such a manner that the sensor performs sensing at the selected setting of sensing, and the learning model corresponding to the category estimated as the category to which a current object to be sensed belongs with a highest probability is selected based on the categories to each of which the previously recognized object to be sensed belongs.

12 Claims, 12 Drawing Sheets

(51) Int. Cl.
*G06F 18/2413* (2023.01)
*G06F 18/2415* (2023.01)
*G06N 7/01* (2023.01)
*G06N 20/00* (2019.01)
*G06V 10/82* (2022.01)
*G06V 30/10* (2022.01)
*G06V 30/18* (2022.01)
*G06V 30/19* (2022.01)

(52) U.S. Cl.
CPC ............ *G06F 18/285* (2023.01); *G06N 7/01* (2023.01); *G06N 20/00* (2019.01); *G06V 10/82* (2022.01); *G06V 30/18057* (2022.01); *G06V 30/19173* (2022.01); *G06V 30/10* (2022.01)

(56) References Cited

U.S. PATENT DOCUMENTS

| | | | |
|---|---|---|---|
| 10,803,387 B1* | 10/2020 | Setty | G06F 40/30 |
| 11,010,421 B2* | 5/2021 | Yada | G06F 16/532 |
| 11,216,663 B1* | 1/2022 | Ettinger | G05D 1/0016 |
| 2009/0208118 A1* | 8/2009 | Csurka | G06V 20/10 |
| | | | 382/228 |
| 2020/0082168 A1* | 3/2020 | Fathi | G06T 7/521 |
| 2022/0130145 A1* | 4/2022 | Connary | G06V 20/10 |

* cited by examiner

FIG.3

| TIME STAMP | LABEL | CATEGORY |
|---|---|---|
| 00:00:00 | 3 | NUMBER |
| 00:00:01 | 5 | NUMBER |
| 00:00:02 | b | ALPHABET |
| 00:00:03 | 8 | NUMBER |
| 00:00:04 | ほ | HIRAGANA |
| 00:00:05 | r | ALPHABET |
| ... | ... | ... |

9A    9B    9C

OBSERVATION DATA MANAGEMENT TABLE 9

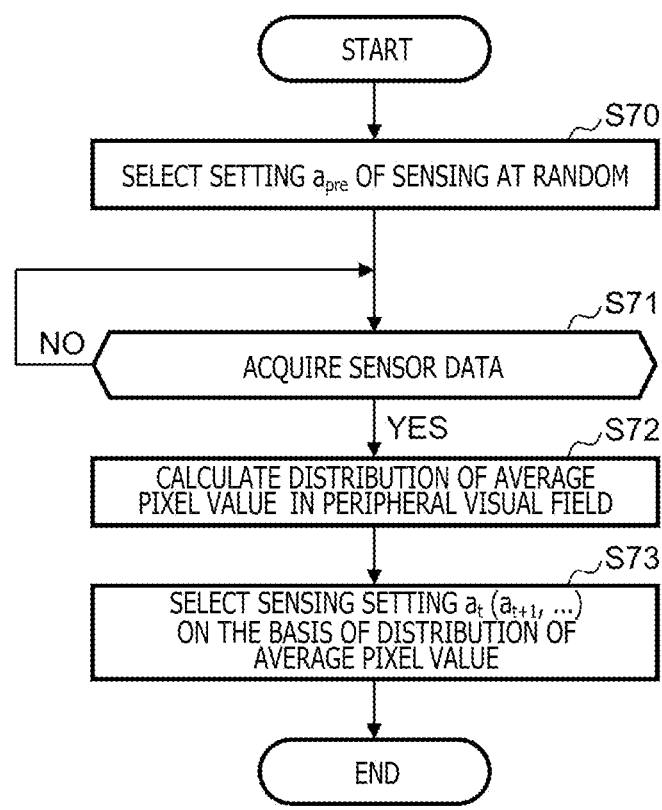
F I G . 1 2

INFORMATION PROCESSING APPARATUS AND INFORMATION PROCESSING METHOD

BACKGROUND OF THE INVENTION

1. Field of the Invention

The present invention relates to an information processing apparatus and an information processing method and is suited to be applied to, for example, a sensing system that recognizes an unknown environment by active sensing.

2. Description of the Related Art

In a case of controlling a machine such as a motor vehicle or a robot in a real space, it is important to recognize a surrounding environment of the machine. Conventionally, a method of recognizing the environment using a sensor mounted in the machine has been a normal method. However, a value acquired at a certain point in time using the sensor is nothing but information obtained by cutting off only a part of the environment. Thus, such an environment recognition approach is equivalent to acquiring a part of information at a reduced information amount, compared with an information amount inherent in the environment.

On the other hand, there is known, as an approach for recognizing the environment using a sensor, active sensing for sensing the environment while producing an action of actively actuating the sensor on the premise that the information amount is reduced. The active sensing is a sensing method including repeatedly producing an action such as an action of changing, after the sensor acquires information, a position at which sensing by the sensor is performed and acquiring information again using the sensor.

As a specific example of such active sensing, a case of applying the active sensing to character recognition will be described. It is supposed herein that there is a task of recognizing each character in an environment in which a plurality of characters are present on the basis of an output from a camera that serves as the sensor.

First, the camera images characters. An image obtained at this time is an image of only one character or a part of the characters, so that it can be said that an information amount of the image is reduced, compared with an information amount inherent in the environment. Next, the camera is caused to take an action of changing the position on the basis of the image captured at a current point in time. When the camera then images the characters again, an image of the characters or a part of the characters that cannot be imaged at the position of the camera at the previous point in time. Repeating imaging by the camera while changing the position of the camera in this way makes it possible to finally recognize all of the plurality of characters.

It is noted that in association with the active sensing technology, JP-1996-030327-A discloses a method of identifying a type, a position, and a posture of an object of interest by clipping of objects based on colors and gray values, template matching, and matching between object images and geometric models stored in a system, and drafting local work plans for grasping the object of interest.

While JP-1996-030327-A describes drafting the work plans based on feature variables of sensor data about the object, it is not always possible to obtain all information necessary for drafting of the work plans only from the feature variables of the sensor data. In a case, for example, in which an infinite number of candidate objects are present and the objects overlap or contact one another, it is difficult to clip and recognize each object only from the feature variables of the sensor data.

The present invention has been achieved in light of the above respects, and an object of the present invention is to provide an information processing apparatus and an information processing method capable of accurately recognizing an object to be sensed.

SUMMARY OF THE INVENTION

To solve the problems, the present invention provides an information processing apparatus for controlling active sensing using a sensor, including: a storage device that stores therein a learning model corresponding to each of a plurality of categories and obtained by learning, and the categories to each of which a previously recognized objects to be sensed belongs; a model selection unit that selects one or a plurality of the learning models from among the learning models stored in the storage device; an observation data latent variable analysis unit that calculates a probability distribution of a latent variable given observation data obtained by sequentially compounding pieces of sensor data applied from the sensor, the probability distribution of the latent variable being output from each of the learning models selected by the model selection unit when the observation data is input to each of the learning models; an observation data information amount analysis unit that calculates a probability distribution of an information amount owned by the observation data at a next cycle on the basis of the probability distribution of the latent variable of the observation data calculated by the observation data latent variable analysis unit and the observation data; and a sensing action selection unit that selects a setting of sensing at the next cycle on the basis of the probability distribution of the information amount owned by the observation data, the probability distribution of the information amount being calculated by the observation data information amount analysis unit. Further, the model selection unit selects the learning model corresponding to the category estimated as the category to which a current object to be sensed belongs with a highest probability on the basis of the categories to each of which the previously recognized object to be sensed stored in the storage device belongs.

Furthermore, the present invention provides an information processing method executed by an information processing apparatus for controlling active sensing using a sensor, the information processing apparatus including a storage device that stores therein a learning model corresponding to each of a plurality of categories and obtained by learning, and the categories to each of which a previously recognized object to be sensed belong, the information processing method including: a first step of selecting one or a plurality of learning models from among the learning models stored in the storage device; a second step of calculating a probability distribution of a latent variable given observation data obtained by sequentially compounding pieces of sensor data applied from the sensor, the probability distribution of the latent variable being output from each of the selected learning models when the observation data is input to each of the learning models; a third step of calculating a probability distribution of an information amount inherent in the observation data at a next cycle on the basis of the calculated probability distribution of the latent variable of the observation data and the observation data; and a fourth step of selecting a setting of sensing at the next cycle on the basis of the calculated probability distribution of the information amount owned by the observation data. Further, the first step includes selecting the learning model corresponding to the category estimated as the category to which a current object to be sensed belongs with a highest probability on the basis of the categories to each of which the previously recognized object to be sensed stored in the storage device belongs.

According to the information processing apparatus and the information processing method of the present invention, recognition processing is performed using the latent variable. Therefore, it is possible to perform the recognition processing using determination of what portion of what label in what category an image portion based on current observation data corresponds to by comparison with labels in each category by which an overall image is grasped in advance.

According to the present invention, it is possible to realize an information processing apparatus and an information processing method capable of more accurately recognizing an object to be sensed.

BRIEF DESCRIPTION OF THE DRAWINGS

FIG. 3 is a chart depicting an example of configurations of an observation data management table;

FIG. 12 is a flowchart depicting process procedures of second sensing setting and selection processing.

DESCRIPTION OF THE PREFERRED EMBODIMENTS

Figure 1:
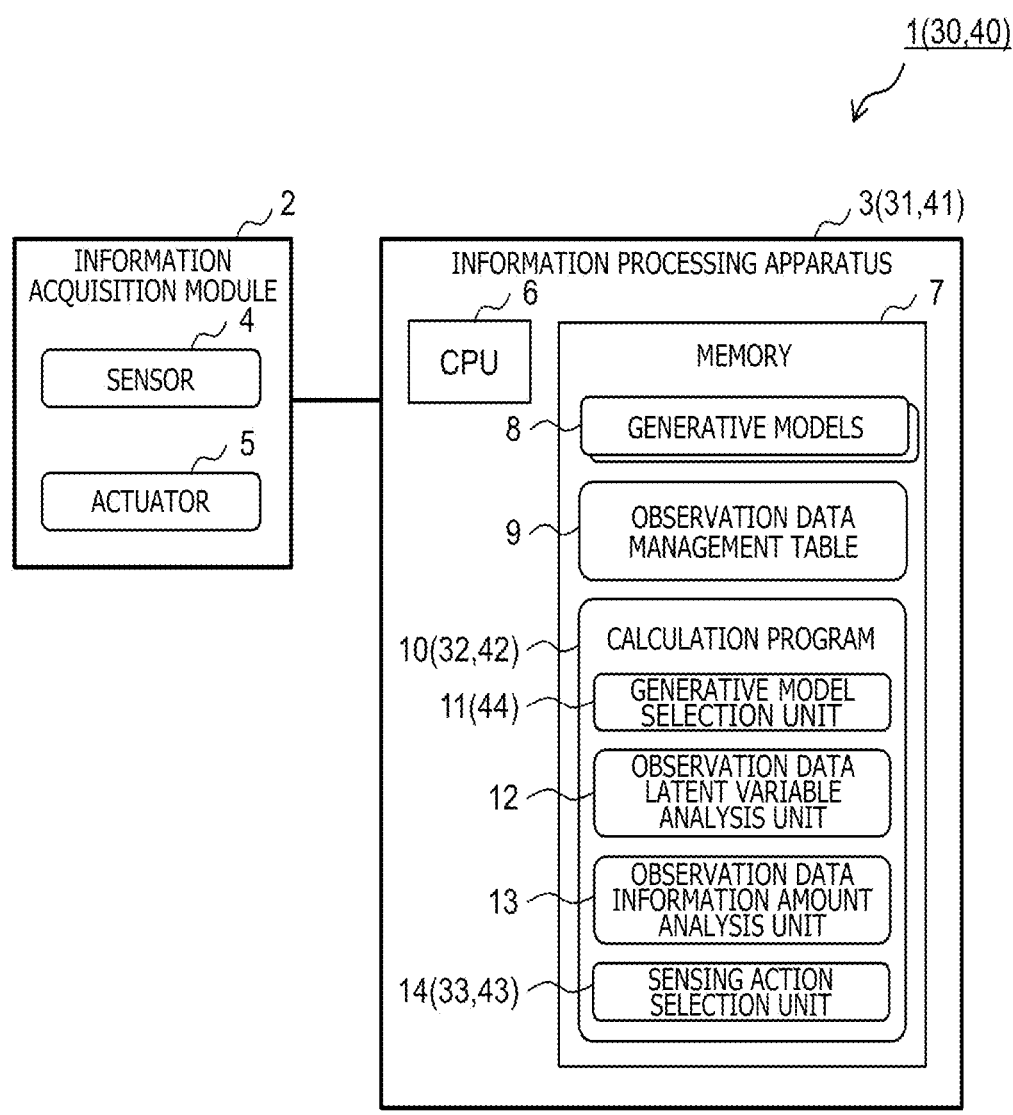
FIG. 1 is a block diagram depicting overall configurations of an information processing system according to first to third embodiments.

Embodiments of the present invention will be described hereinafter with reference to the drawings.

The embodiments described hereinafter are exemplarily given for describing the present invention, and description will be omitted and simplified as appropriate for clarification of the description. The present invention can be carried out in various other forms. Unless specified otherwise, each constituent element may be used either in the singular or in the plural.

In the drawings, for facilitating understanding of the invention, a position, a magnitude, a shape, a range, and the like of each constituent element depicted in the drawings do not often represent an actual position, an actual magnitude, an actual shape, an actual range, and the like thereof. For this reason, the present invention is not always limited to the positions, the magnitudes, the shapes, the ranges, and the like disclosed in the drawings.

While examples of various information are often described using expressions such as "table," "list," and "queue," the various information may be expressed in a data structure other than these expressions. For example, the various information such as "XX table," "XX list," or "XX queue" may be expressed as "XX information." While expressions such as "identification information," "identifier," "name," "ID," and "number," are used at a time of describing identification information, these expressions can be replaceable.

In a case in which a plurality of constituent elements have an identical or similar function, the constituent elements are often described with an additional character added to the same reference character to denote each constituent element. Furthermore, in a case of no need to distinguish these constituent elements, the constituent elements are often described with the additional characters omitted.

In the embodiments, processing performed by executing a program is often described. A computing machine executes herein the program by a processor (for example, a CPU or a GPU) and performs processing specified by the program while using storage resources (for example, a memory), an interface device (for example, a communication port), and the like. For that reason, a subject that performs the processing by executing the program may be the processor.

Likewise, a subject that performs processing by executing the program may be a controller, an apparatus, a system, a computing machine, or a node having the processor. A subject that performs processing by executing the program may be a computing section and may include a dedicated circuit that performs specific processing. Examples of the dedicated circuit include herein a field programmable gate array (FPGA), an application specific integrated circuit (ASIC), and a complex programmable logic device (CPLD).

The program may be installed into the computing machine from a program source. The program source may be, for example, a program distribution server or a computing machine-readable memory media. In a case in which the program source is the program distribution server, then the program distribution server includes a processor and storage resources storing a program to be distributed, and the processor of the program distribution server may distribute the program to be distributed to other computing machines. Furthermore, in the embodiments, two or more programs may be realized as one program, or one program may be realized as two or more programs.

(1) First Embodiment

(1-1) Configurations of Information Processing System According to the Present Embodiment In FIG. 1, 1 denotes an information processing system (sensing system) according to the present embodiment as a whole. This information processing system 1 is a system designed to be capable of grasping an unknown environment by active sensing, and is configured with an information acquisition module 2 and an information processing apparatus 3.

The information acquisition module 2 is configured with a sensor 4 that acquires information about a surrounding environment, and an actuator 5 that changes a position, a direction, a sensitivity, and the like of the sensor 4. The sensor 4 may be any type of sensor such as a camera, a pressure sensor, or a temperature sensor as long as the sensor 4 can acquire the information about the surrounding environment and output a signal based on the acquired information. Furthermore, the number of sensors 4 is not limited to one but a plurality of sensors 4 of the same type or a combination of a plurality of types of sensors 4 may be used.

The information processing apparatus 3 is a computing apparatus that has a function to control active sensing using the sensor 4. Specifically, the information processing apparatus 3 is the computing apparatus that selects a setting of sensing at a next cycle such as a position at which sensing is to be performed and a range (sensing range) to be sensed by the sensor 4 at the next cycle on the basis of observation data obtained by compounding pieces of sensor data applied from the sensor 4 by that time, and that has a function to control the actuator 5 of the information acquisition module 2 in such a manner that the sensor 4 performs sensing at the selected setting of sensing.

For facilitating understanding, it is assumed hereinafter that the sensor 4 is a camera, and that tasks of the information processing apparatus 3 are to select the setting of sensing at the next cycle such as the position, the range, and the like at and in which the sensor 4 of the information acquisition module 2 is to perform imaging at the next cycle for recognizing each character in an environment in which a plurality of characters are present, and to control the actuator 5 of the information acquisition module 2 on the basis of a selection result.

The information processing apparatus 3 is configured from a general-purpose computer apparatus having information processing resources such as a central processing unit (CPU) 6 and a memory 7. The CPU 6 is a processor that executes various kinds of computing. Furthermore, the memory 7 is configured from, for example, a semiconductor memory and used as a work memory for the CPU 6. The memory 7 stores therein at least a plurality of generative models 8, an observation data management table 9, and a calculation program 10.

Each of the generative models 8 is a learning model to which the observation data described above is input and from which a label of a latent variable of the observation data (primary factor for obtaining the observation data) is output. The generative model 8 trained according to each of categories (including herein Number, Alphabet, Hiragana, Katakana, and the like), to which the observation data belongs, using observation data previously acquired in sensing environments other than a current sensing environment is stored in the memory 7.

It is noted that an encoder in, for example, a variational autoencoder (VAE) is used to calculate the latent variable. The VAE is configured from the encoder and a decoder, and trained to minimize an error between an output from the decoder when the observation data is input to the encoder and the corresponding observation data. The output from the encoder corresponds to the latent variable (vector representation) of the observation data.

Figure 2:
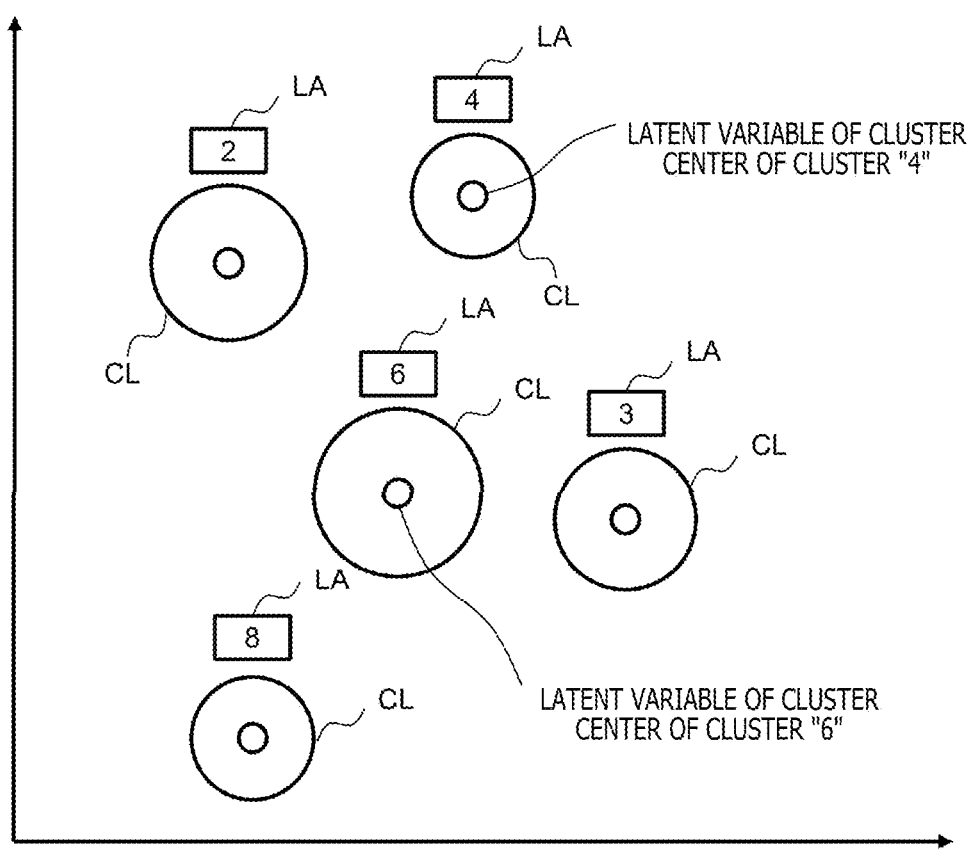
FIG. 2 is a conceptual diagram used for description of a generative model.

As depicted in FIG. 2, latent variables of the observation data used in the training of the generative model 8 corresponding to each category are classified into clusters for each constituent element of the category, and a label LA is assigned to each cluster CL. In a case of the training using, for example, observation data belonging to the category Number, characters such as "0," "1," "2," and the like are assigned to the clusters CL as the labels LA. Each label LA is not always a character but may be, for example, a reconstructed image output from the VAE when the latent variable at each cluster center is input to the decoder in the VAE.

The observation data management table 9 is a table used to hold and manage information about previously recognized objects (characters) to be sensed, and configured with time stamp fields 9A, label fields 9B, and category fields 9C as depicted in FIG. 3. One row in the observation data management table 9 corresponds to one previously recognized object to be sensed.

Furthermore, a clock time at which a corresponding object to be sensed is recognized and information about the object to be sensed is registered in this observation data management table 9 is stored in the time stamp field 9A in one row, and a label of the latent variable of the observation data about the corresponding object to be sensed is stored in the label field 9B in the row. In addition, a category to which the corresponding object to be sensed belongs is stored in the category field 9C in the row.

The calculation program 10 is a program that has functions to calculate a setting of sensing at the next cycle on the basis of the sensor data applied from the information acquisition module 2, the previous observation data, and each of the generative models 8 stored in the memory 7, and to control the actuator 5 of the information acquisition module 2 on the basis of a calculation result.

This calculation program 10 is configured from a generative model selection unit 11, an observation data latent variable analysis unit 12, an observation data information amount analysis unit 13, and a sensing action selection unit 14. Functions of the generative model selection unit 11, the observation data latent variable analysis unit 12, the observation data information amount analysis unit 13, and the sensing action selection unit 14 will be described later.

(1-2) Sensing Control Processing

Figure 4:
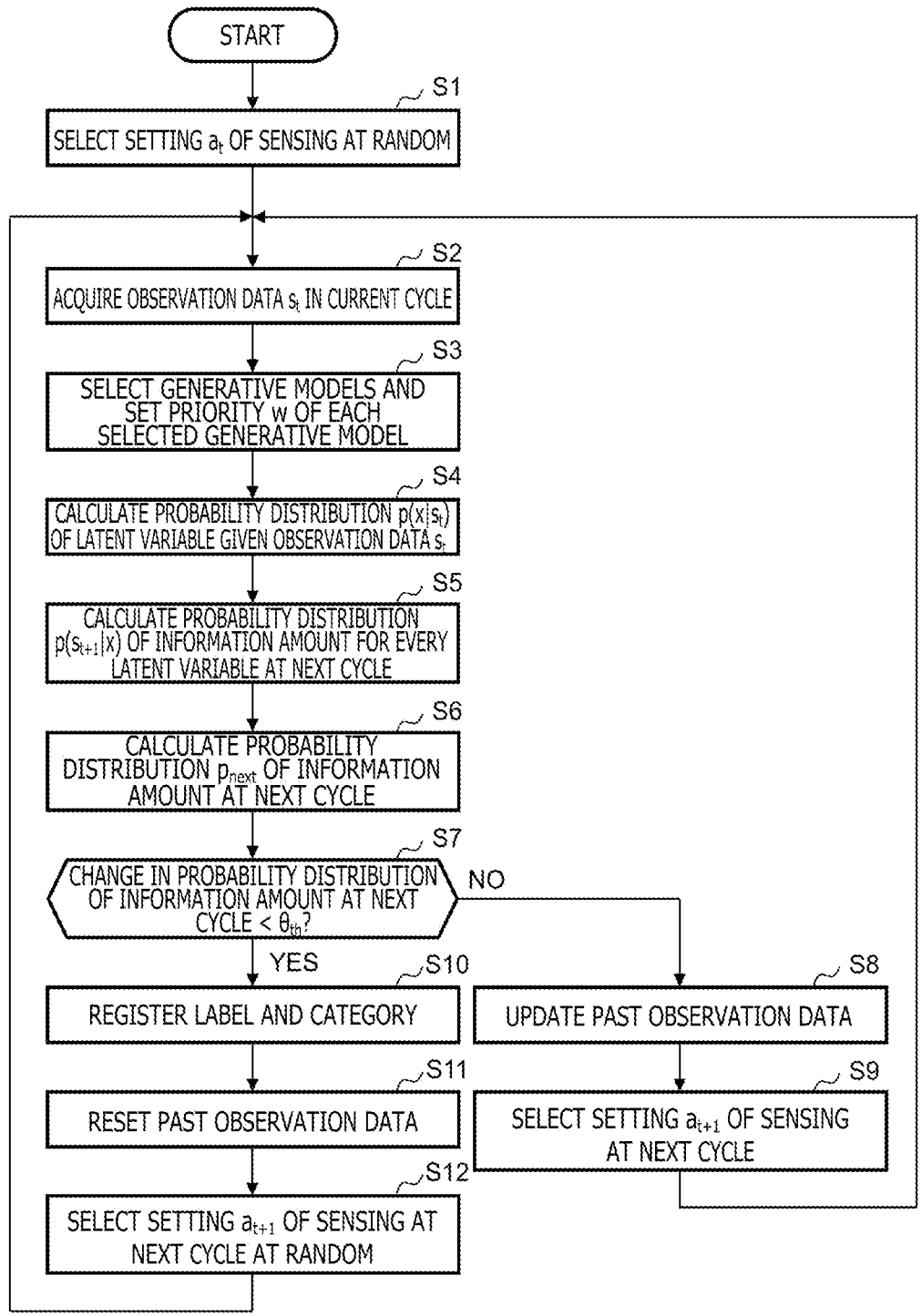
FIG. 4 is a flowchart depicting processing procedures of sensing control processing according to the first embodiment.

FIG. 4 depicts a flow of sensing control processing executed in the information processing apparatus 3 on the basis of the sensor data applied from the sensor 4 of the information acquisition module 2. The information processing apparatus 3 controls sensing using the sensor 4 of the information acquisition module 2 according to processing procedures depicted in this FIG. 4.

It is noted that a subject that performs various kinds of processing is assumed as the generative model selection unit 11, the observation data latent variable analysis unit 12, the observation data information amount analysis unit 13, or the sensing action selection unit 14 of the calculation program 10 described above with reference to FIG. 1 in the following description. Needless to say, the CPU 6 actually executes the processing on the basis of the generative model selection unit 11, the observation data latent variable analysis unit 12, the observation data information amount analysis unit 13, and the sensing action selection unit 14.

This sensing control processing is started upon startup of the information processing apparatus 3, and the sensing action selection unit 14 first selects a setting $a_t$ of first sensing at random, and controls the actuator 5 of the information acquisition module 2 in such a manner that the sensor 4 performs sensing at the selected setting (S1). As a result, the sensor 4 performs sensing at this setting $a_t$, and sensor data (image data) that is a result of the sensing is transmitted to the information processing apparatus 3. Furthermore, the sensing action selection unit 14 then calls the generative model selection unit 11.

When being called by the sensing action selection unit 14, the generative model selection unit 11 acquires data obtained by compounding data obtained by sequentially compounding previously acquired pieces of sensor data (hereinafter, referred to as "past observation data") with the sensor data applied from the information acquisition module 2 at that time as observation data $s_t$ in a current cycle (S2).

It is noted, however, that the past observation data is not present in Step S2 right after start of this sensing control processing. Therefore, the generative model selection unit 11 acquires the sensor data applied from the information at that time as the observation data $s_t$ in the current cycle.

Subsequently, the generative model selection unit 11 selects one or more generative models 8 from among the generative models 8 according to the categories such as the categories Number and Alphabet stored in the memory 7, and sets a priority w of each selected generative model 8 (S3).

The selection of the one or more generative models 8 and the setting of the priorities w are made on the basis of proportions of the total numbers of past observation data belonging to the categories (proportions of the total numbers of characters belonging to the categories and recognized by that time). In the present embodiment, the generative model selection unit 11 selects the generative models 8 corresponding to the top two categories higher in the total number of the past observation data belonging to each category, and sets values obtained by normalizing the proportions of the total numbers of past observation data belonging to the top two categories as the priorities w of the corresponding generative models 8.

For example, in a case of the example of FIG. 3, "Number" is the highest in the total number of past observation data and "Alphabet" is the second highest in the total number of already recognized characters among the categories stored in the category field 9C of each entry in the observation data management table 9. Therefore, the generative model selection unit 11 selects the generative models 8 corresponding to the categories "Number" and "Alphabet."

Furthermore, the total number of past observation data belonging to the category "Number" is three, the total number of past observation data belonging to the category "Alphabet" is two, and a ratio of these total numbers is 3:2. Therefore, the generative model selection unit 11 sets "0.6" as the priority w of the generative model 8 corresponding to the category "Number" and "0.4" as the priority w of the generative model 8 corresponding to the category "Alphabet" out of 0.6:0.4 obtained by normalizing the ratio.

By adopting such a method, it is possible to select the generative models 8 corresponding to the categories estimated as categories of the current objects (characters) to be sensed with the highest probability, and set the appropriate priorities w according to a result of past recognition to these generative models 8.

It is noted that the generative models 8 selected in Step S3 are not limited to the generative models 8 corresponding to the top two categories high in the total number of past observation data. The generative model selection unit 11 may select one generative model 8 corresponding to the category highest in the total number of past observation data or the generative models 8 corresponding to the top three or more categories high in the total number. Furthermore, a criterion of the selection of the generative models 8 and the setting of the priorities w is not limited only to such proportions of the total numbers.

Moreover, the selection of the generative models 8 and the setting of the priorities w may be made only in one cycle out of a plurality of cycles, and the generative models 8 and the priorities w that are latest set may be used as they are in the other cycles. Furthermore, the generative model selection unit 11 may select the generative models 8 corresponding to the categories each having the label with a high probability in an information amount probability distribution $p_{next}$, to be described later, calculated in Step S6 in a previous cycle, and set the priorities w according to the probabilities.

Upon selecting one or more generative models 8 as described above and setting the priorities w of the selected generative models 8, the generative model selection unit 11 calls the observation data latent variable analysis unit 12.

Upon being called by the generative model selection unit 11, the observation data latent variable analysis unit 12 calculates a latent variable probability distribution $p(x|s_t)$ of observation data $s_t$ in the current cycle acquired by the generative model selection unit 11 in Step S2 at that time using the selected generative models 8 and the set priorities w by the generative model selection unit 11 in Step S3 (S4).

Figure 5A:
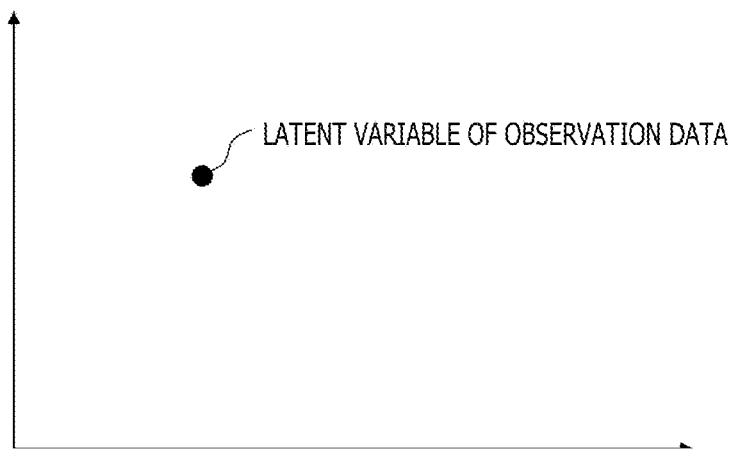
FIG. 5A is a conceptual diagram used for description of a processing content of an observation data latent variable analysis unit.

Specifically, the observation data latent variable analysis unit 12 calculates a latent variable of the observation data $s_t$ about each category corresponding to each of the generative models 8 as depicted in FIG. 5A, by inputting the observation data $s_t$ acquired in Step S2 to each of these generative model 8 selected in Step S3.

Figure 5B:
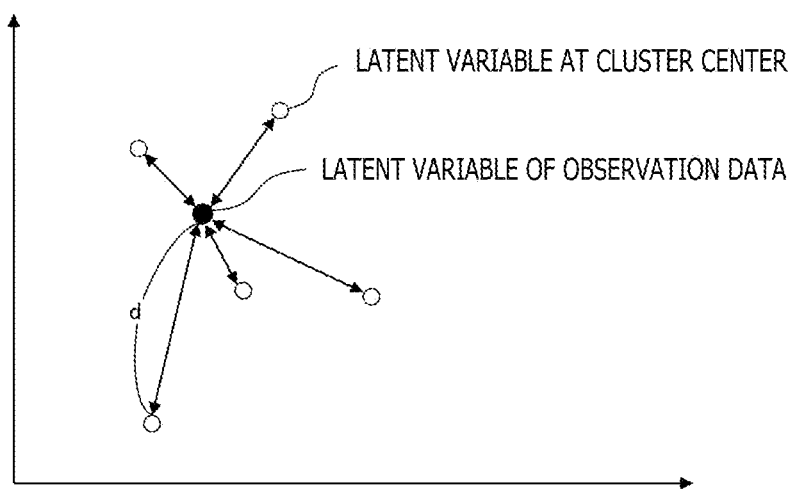
FIG. 5B is a conceptual diagram used for description of the processing content of the observation data latent variable analysis unit.

Furthermore, as depicted in FIG. 5B, the observation data latent variable analysis unit 12 calculates a distance (Euclidean distance) d between the calculated latent variable and a latent variable at a cluster center of each cluster CL (FIG. 2) with the label belonging to each of the categories corresponding to the generative models 8 used in calculation of the latent variable by the following Equation (1). It is noted that in Equation (1), $y_c$ represents a latent variable vector at the cluster center of a cluster c, and z represents a latent variable vector of the observation data $s_t$.

[Equation 1]

$$d=\sqrt{(y_c-z)^2} \qquad (1)$$

As expressed by the following Equation, if a reciprocal of each distance d calculated in Equation (1) is normalized by a sum of reciprocals of the distances d between the calculated latent variable and the latent variables at all cluster centers belonging to the category corresponding to each of the generative models 8 used in calculation of the latent variable, a probability distribution $p(x|s_t)$ of a latent variable x of each category is obtained. In Equation (2), C represents a set of clusters belonging to the category and $y_b$ represents a latent variable vector at the cluster center of a cluster b.

[Equation 2]

$$p(x|s_t) = \frac{1/d}{\sum_{b \in C} 1/\sqrt{(y_b - z)^2}} \quad (2)$$

Figure 6:
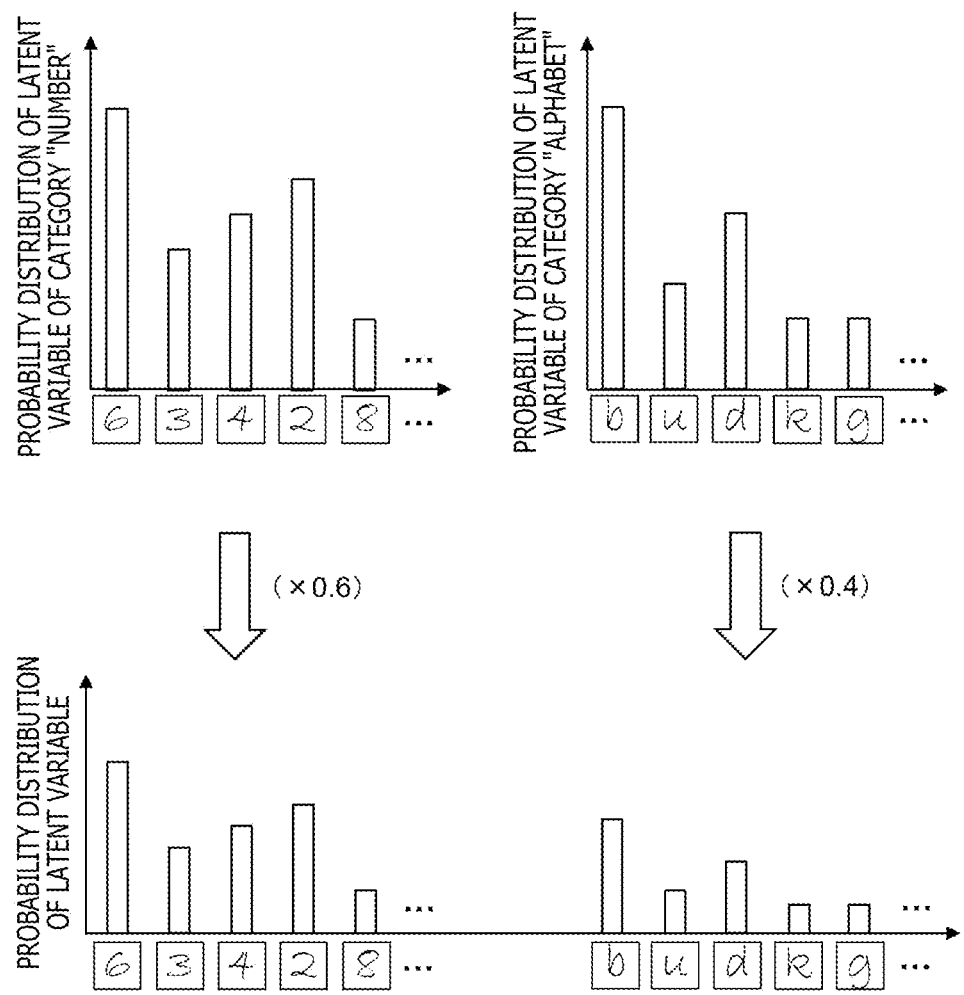
FIG. 6 is a conceptual diagram used for description of the processing content of the observation data latent variable analysis unit.

FIG. 6 depicts an example of the probability distribution $p(x|s_t)$ of the latent variable calculated as described above. In FIG. 6, an upper left row is a probability distribution $p(x|s_t)$ of the latent variables of the category "Number," and an upper right row is a probability distribution $p(x|s_t)$ of the latent variables of the category "Alphabet." A probability that the calculated latent variable belongs to one cluster is higher as the distance d between the latent variables is smaller, and the probability that the calculated latent variable belongs to the cluster is lower as the distance d between the latent variables is larger. It is noted that the distance d between the latent variables is not necessarily the Euclidean distance between the vectors. For example, variances of the latent variables belonging to clusters may be also calculated and the distance between the latent variables may be a Mahalanobis' generalized distance. Furthermore, a normalization method is not limited to that based on Equation (2) but a SoftMax function or the like may be used. Moreover, a method of calculating the latent variable probability distribution $p(x|s_t)$ is not limited to the method based on the distance between the latent variables. A machine learning model to which the observation data is input and from which the latent variable and the label corresponding to the latent variable are output may be trained in advance, and the latent variable probability distribution $p(x|s_t)$ may be calculated on the basis of the trained machine learning model.

After calculating the latent variable probability distribution $p(x|s_t)$ of each generative model 8, the observation data latent variable analysis unit 12 multiplies each probability distribution $p(x|s_t)$ by the corresponding priority w set in Step S3 to combine the probability distribution $p(x|s_t)$ with the priority w, as depicted in lower rows of FIG. 6. In the example described above, each latent variable probability distribution $p(x|s_t)$ of the category "Number" is multiplied by 0.6, and each latent variable probability distribution $p(x|s_t)$ of the category "Alphabet" is multiplied by 0.4 to combine the probability distributions with the priorities w. Upon being completed with the processing described so far, the observation data latent variable analysis unit 12 calls the observation data information amount analysis unit 13.

Upon being called by the observation data latent variable analysis unit 12, the observation data information amount analysis unit 13 calculates an information amount probability distribution $p(s_{t+1}|x)$ for each latent variable at a next cycle (S5).

Figure 7A:
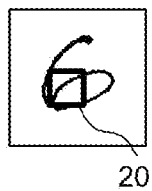
FIG. 7A is a conceptual diagram used for description of a processing content of an observation data information amount analysis unit.

Specifically, the observation data information amount analysis unit 13 first calculates a position (position surrounded by a frame 20 in FIG. 7A) of the observation data $s_t$ about the object to be sensed (character herein) at a current cycle, as depicted in FIG. 7A. For example, the observation data information amount analysis unit 13 assumes the observation data $s_t$ as a template image, inputs the latent variable at each cluster center for each category to the decoder in the VAE, performs template matching within a reconstructed image output from the decoder in the VAE, and sets a position at a highest matching degree as the position of the observation data $s_t$ at the current cycle.

It is noted that a method other than the template matching may be used for calculation of the position of the observation data $s_t$ at the current cycle. For example, the observation data information amount analysis unit 13 may select that the position of the observation data $s_t$ at the current cycle is a lower left position of the object to be sensed if a pixel value distribution of the observation data $s_t$ leans to the upper right. In this way, the observation data information amount analysis unit 13 may calculate the position of the observation data $s_t$ at the current cycle on the basis of the pixel value distribution of the observation data $s_t$.

Figure 7B:
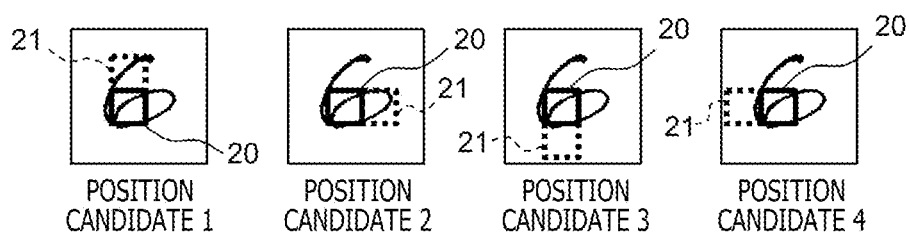
FIG. 7B is a conceptual diagram used for description of the processing content of the observation data information amount analysis unit.

Next, the observation data information amount analysis unit 13 makes a list of candidates of the position at the next cycle (positions surrounded by broken-line frames 21 in FIG. 7B, hereinafter, referred to as "position candidates"). As depicted in, for example, FIG. 7B, in a case in which the position candidates at the next cycle are four position candidates to which the sensor 4 is "moved up," "moved right," "moved down," and "moved left" by ten pixels of an image, positions up, right, down, and left by ten pixels are the position candidates at the next cycle.

It is noted that the position candidates to be sensed at the next cycle are set according to a rule set by a user or the like in advance. For example, in a case of setting the rule that the position candidates to be sensed at the next cycle are "positions to which the position to be sensed at the current cycle is moved "upper left," "up," "upper right," "right," "lower right," "down," "lower left," and "left" by ten pixels," these nine positions are the position candidates to be sensed at the next cycle.

Figure 7C:
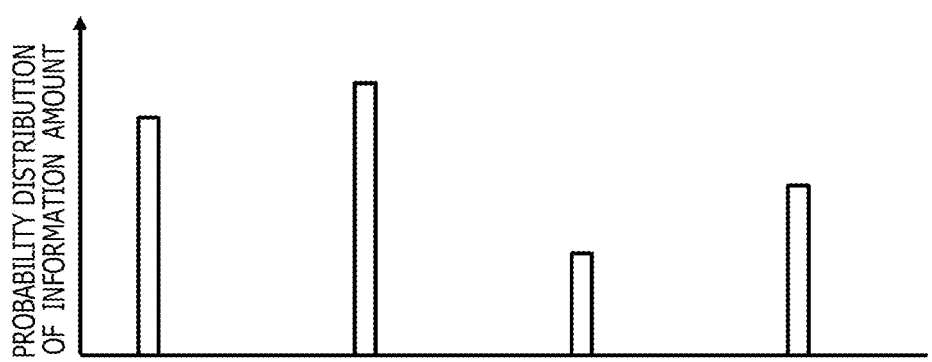
FIG. 7C is a conceptual diagram used for description of the processing content of the observation data information amount analysis unit.

Subsequently, the observation data information amount analysis unit 13 calculates a total information amount between the observation data $s_t$ at the position at the current cycle and a predicted value of observation data $s_{t+1}$ at the position candidate at the next cycle for each of the position candidates at the next cycle. As the information amount, an entropy of the image, a pixel count of nonzero pixel values, a latent variable probability distribution $p(x|s_{t+1})$, or the like is used. As depicted in FIG. 7C, a result of normalizing the calculated total information amount for each of the position candidates at the next cycle by a total information amount of all position candidates at the next cycle corresponding to the cluster is the information amount probability distribution $p(s_{t+1}|x)$ at the next cycle. The observation data information amount analysis unit 13 performs the calculation described above for every cluster. Furthermore, the position candidates to be sensed are not limited to discrete positions but may be handled as continuous positions. In a case of handling the position candidates to be sensed as continuous positions, the latent variable probability distribution is a latent variable probability density function.

Next, the observation data information amount analysis unit 13 calculates the information amount probability distribution $p_{next}$ at the next cycle using the latent variable probability distribution $p(x|s_t)$ calculated by the observation data latent variable analysis unit 12 in Step S4 and the information amount probability distribution $p(s_{t+1}|x)$ calculated in Step S5 (S6), as expressed by the following Equation.

[Equation 3]

$$p_{next} = \Sigma_x p(x|s_t) \log p(s_{t+1}|x) \quad (3)$$

Next, the observation data information amount analysis unit 13 determines whether a difference between an information amount probability distribution at the current cycle and the information amount probability distribution $p_{next}$ at the next cycle calculated in Step S6 is smaller than a preset threshold $\theta_{th}$ (S7). It is noted that this threshold $\theta_{th}$ is a numerical value close to "0" and set in advance on the basis of an information amount necessary for the information processing apparatus 3 to ensure recognition of the objects to be sensed. Furthermore, an element used in determination is not limited to the difference between the information amount probability distribution at the current cycle and the information amount probability distribution $p_{next}$ at the next cycle, and the observation data information amount analysis unit 13 may determine whether a stochastic variable having a maximum value in the information amount probability distribution at the current cycle coincides with a stochastic variable having a maximum value in the information amount probability distribution at the next cycle.

Obtaining a result NO of this determination means that information about the object to be sensed is not acquired yet at the current cycle to such an extent that the object to be sensed can be recognized, and that there is a probability that much information necessary to recognize the object to be sensed can be acquired by sensing at the next and following points in time. At this time, therefore, the observation data information amount analysis unit 13 calls the sensing action selection unit 14 in an update mode.

Upon being called in the update mode, the sensing action selection unit 14 updates the "past observation data" used in Step S2 in the next cycle to data obtained by compounding the "past observation data" used in Step S2 in the current cycle with the sensor data acquired from the information acquisition module 2 in Step S2 in the current cycle (S8). By doing so, image data about a composite image based on the data obtained by compounding all sensor data acquired in cycles until the current cycle is generated as the "past observation data" used by the generative model selection unit 11 in Step S2 in the next cycle.

Subsequently, the sensing action selection unit 14 selects a setting $a_{t+1}$ of sensing at the next cycle, controls the actuator 5 of the information acquisition module 2 in such a manner that the sensor 4 performs sensing at the next cycle at a determined position (hereinafter, referred to as "selected position" (S9).

Specifically, the sensing action selection unit 14 selects and determines the position candidate having a largest information amount as the setting $a_{t+1}$ of sensing at the next cycle among the position candidates at the next cycle on the basis of the information amount probability distribution $p_{next}$ at the next cycle calculated in Step S6, as represented by the following Equation. Selecting and determining the position candidate having the largest information amount as the setting $a_{t+1}$ of sensing at the next cycle in this way make it possible to efficiently collect the information about the object to be sensed and to improve processing efficiency of character recognition processing. In addition, the sensing action selection unit 14 then controls the actuator 5 of the information acquisition module 2 in such a manner that the sensor 4 performs sensing at the next cycle at the selected and determined position of the position candidate (hereinafter, referred to as "selected position").

[Equation 4]

$$a_{t+1}=\mathrm{argmax}_a\{\Sigma_x p(x|s_t)\log p(s_{t+1}|x)\} \quad (4)$$

As a result, at the next cycle, the sensor data acquired by the sensor 4 at such a selected position is applied to the information processing apparatus 3. Furthermore, the processing in Steps S2 to S9 is then repeated in a similar manner as that described above until a result YES of the determination is obtained in Step S7. Through this repeated processing, the information about the object to be sensed (image data) is gradually collected.

Furthermore, the result YES of the determination is obtained in Step S7 when the information about the object to be sensed is acquired in the course of time to such an extent that the object to be sensed can be recognized and it is impossible to acquire so much new information even by repeating sensing any longer.

Thus, the observation data information amount analysis unit 13 definitively determines the label of the cluster having the highest probability in the latent variable probability distribution $p(x|s_t)$ of the current observation data $s_t$ calculated by the observation data latent variable analysis unit 12 in Step S4 as the label of the object to be sensed at that time, definitively determines the category to which the cluster belongs as the category to which the object to be sensed belongs, and registers these definitive determination results in the observation data management table 9 of FIG. 3 (S10).

Specifically, the observation data information amount analysis unit 13 allocates one unused row in the observation data management table 9, stores the label definitively determined as described above in the label field 9B (FIG. 3) in the row, and stores the category definitively determined as described above in the category field 9C (FIG. 3) in the row. In addition, the observation data information amount analysis unit 13 stores a current clock time in the time stamp field 9A (FIG. 3) in the row as a time stamp. Recognition of the object to be sensed at that time is thereby completed.

It is noted that the number of labels or categories registered in the observation data management table 9 is not necessarily one, and labels and categories of a plurality of higher clusters may be definitively determined as the labels and the categories of the object to be sensed and registered in the observation data management table 9. Alternatively, the definitively determined labels and categories may be registered in the observation data management table 9 with the probability distributions added thereto. In another alternative, information about elements other than the label of the cluster with the highest probability may be registered in the observation data management table 9. This is effective in a case of updating the information registered in the observation data management table 9 at the current cycle on the basis of analysis of observation data $s_t$ acquired in later cycles.

The observation data information amount analysis unit 13 then calls the sensing action selection unit 14 in a reset mode. Furthermore, upon being called in the reset mode, the sensing action selection unit 14 first resets the "past observation data" (S11). Moreover, the sensing action selection unit 14 selects the setting $a_{t+1}$ of the sensing at the next cycle such as a position and a range to be sensed at the next cycle in a similar manner as that of Step S1, and controls the actuator 5 of the information acquisition module 2 in such a manner that the sensor 4 performs sensing at the selected setting (S12).

Furthermore, the sensing action selection unit 14 then calls the generative model selection unit 11. As a result, sensor data output from the sensor 4 at this setting $a_{t+1}$ is transmitted to the information processing apparatus 3, and the processing in and after Step S2 is then repeated in a similar manner as that described above.

(1-3) Advantages of the Present Embodiment

As described so far, in the information processing system 1 according to the present embodiment, the information processing apparatus 3 calculates the latent variable probability distribution $p(x|s_t)$ output when the observation data $s_t$ in the current cycle is input to each of the generative models 8 selected by the generative model selection unit 11, and calculates the information amount probability distribution $p(s_{t+1}|x)$ for each latent variable at the next cycle. The information processing apparatus 3 then calculates the information amount probability distribution $p_{next}$ for each latent variable at the next cycle on the basis of the calculated and combined latent variable probability distributions $p(x|s_t)$ and the information amount probability distribution $p(s_{t+1}|x)$ at the next cycle, and the sensing action selection unit 14 selects the setting $a_{t+1}$ of sensing at the next cycle on the basis of the calculation result.

In this way, the present information processing apparatus 3 performs recognition processing using the latent variable. Therefore, it is possible to perform the recognition processing using determination of what portion of what label in what category an image portion based on current observation data corresponds to by comparison with labels in each category by which an overall image is grasped in advance. Therefore, it is possible to realize an information processing apparatus capable of more accurately recognizing each object to be sensed, compared with a case in which the object to be sensed is recognized only from feature variables of the sensor data, even when characters that are objects to be sensed overlap or contact.

Furthermore, the present information processing apparatus 3 selects the top two categories high in the total number of past observation data belonging to each category on the basis of the past recognition result registered in the observation data management table 9, and sets the values obtained by normalizing the proportions of the total numbers of past observation data belonging to the top two categories as the priorities w of the corresponding generative models 8.

According to the present information processing system 1, therefore, it is possible to select the generative models 8 corresponding to the categories estimated as categories of the current objects (characters) to be sensed with the highest probability, and set the appropriate priorities w according to a result of past recognition to these generative models 8. For example, it is possible to effectively prevent occurrence of a situation in which the generative model selection unit 11 falsely selects the generative models 8 corresponding to "Hiragana" or "Katakana" by false selection in circumstances in which only "Number" and "Alphabet" have been detected so far.

According to the present embodiment, therefore, it is possible to effectively prevent occurrence of false recognition of an object to be sensed resulting from selection of false generative models 8 by the generative model selection unit 11; thus, it is possible to realize an information processing system capable of more highly accurately recognizing an object to be sensed.

(2) Second Embodiment

In FIG. 1, 30 denotes an information processing system according to a second embodiment as a whole. This information processing program 30 is configured similarly to the information processing system 1 according to the first embodiment except that a sensing action selection unit 33 in a calculation program 32 of an information processing program 31 selects the setting $a_t$ of sensing at the next cycle on the basis of sensor data obtained by enlarging a visual field.

Figure 8:
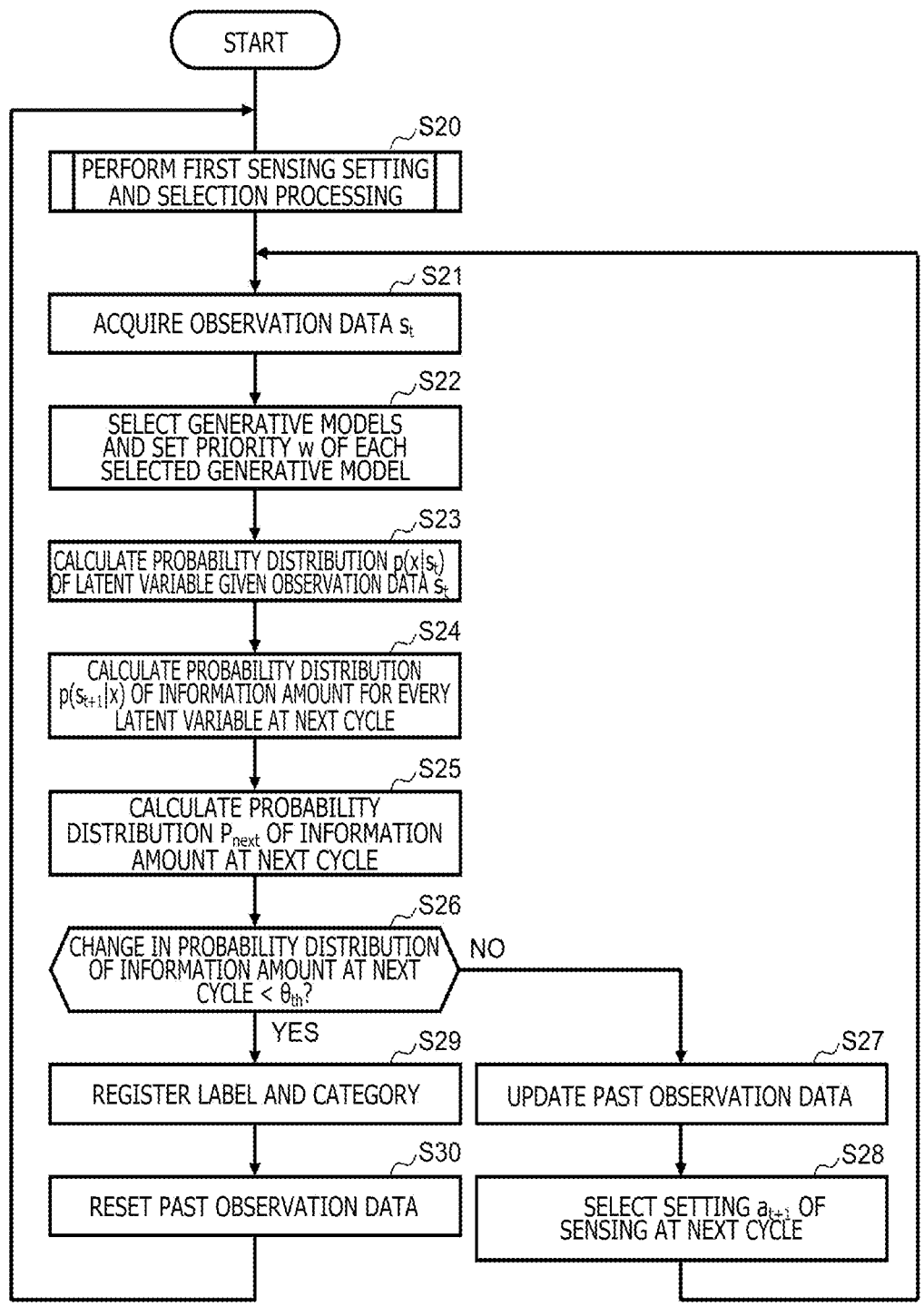
FIG. 8 is a flowchart depicting processing procedures of sensing control processing according to the second embodiment.

FIG. 8 depicts a flow of a series of sensing control processing executed in the information processing apparatus according to the present embodiment. The information processing program 31 according to the present embodiment sequentially makes settings of sensing to the sensor 4 of the information acquisition module 2 according to processing procedures depicted in this FIG. 8.

In actuality, this sensing control processing is started upon startup of the information processing apparatus 31, and the sensing action selection unit 33 first executes first sensing setting and selection processing for selecting the setting $a_t$ of sensing in the current cycle (S20).

Figure 9:
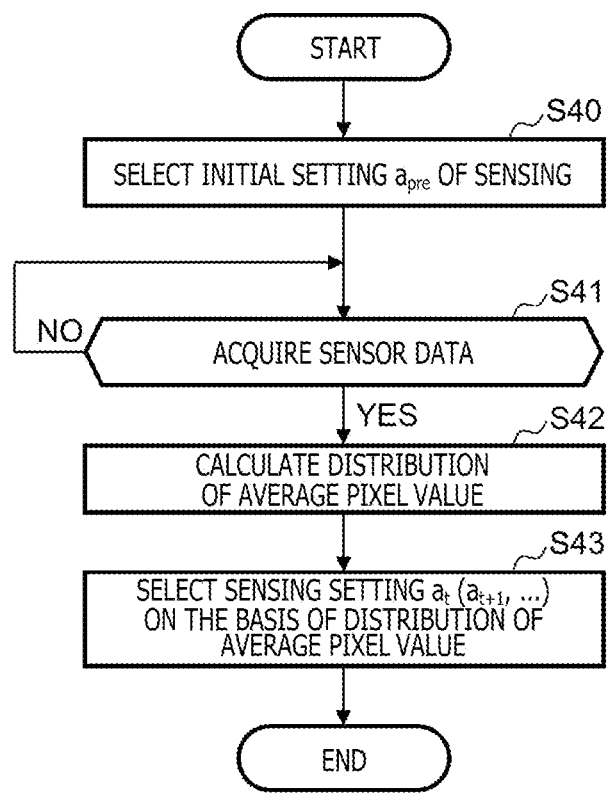
FIG. 9 is a flowchart depicting processing procedures of first sensing setting and selection processing.

FIG. 9 depicts a specific processing content of this first sensing setting and selection processing. When this first sensing setting and selection processing is started, the sensing action selection unit 33 first selects a setting of sensing that is a predetermined low resolution and a predetermined wide angle visual field set by the user or the like in advance as an initial setting a pre of sensing, and controls the actuator 5 of the information acquisition module 2 in such a manner that the sensor 4 performs sensing at the selected initial setting a pre (S40). It is noted that the sensing action selection unit 33 may control either the sensor 4 as well as the actuator 5 or only the sensor 4 as an alternative to the actuator 5 at this time.

Subsequently, the sensing action selection unit 33 waits for sensor data (image data) acquired by the sensor 4 at the initial setting a pre described above to be applied to the sensing action selection unit 33 from the information acquisition module 2 (S41). Upon receiving the sensor data in the course of time, the sensing action selection unit 33 calculates an distribution of average pixel value of an image based on the sensor data received at that time (S42).

Figure 10:
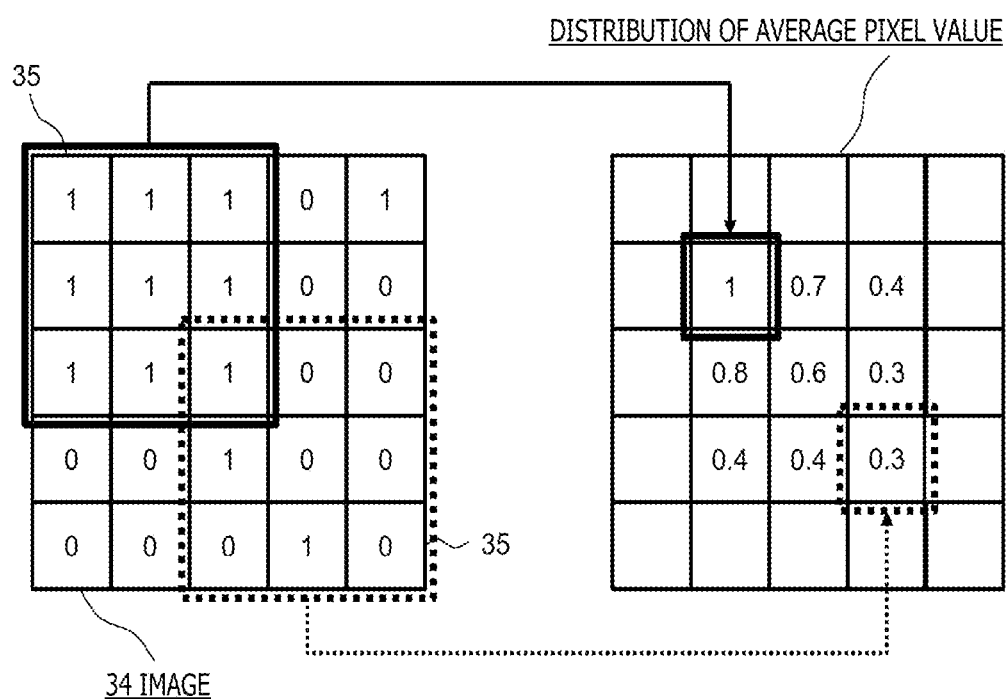
FIG. 10 is a conceptual diagram used for description of an distribution of average pixel value.

Specifically, as depicted in FIG. 10, the sensing action selection unit 33 evenly moves entirety within an image 34 based on such sensor data while moving a square area portion 35 having each side configured from odd-numbered pixels in the image 34 based on the sensor data from one corner portion of the image 34 in a horizontal direction or a vertical direction by one pixel at a time. At this time, the sensing action selection unit 33 calculates the distribution of average pixel value of the image 34 by calculating an average value of pixel values of the pixels contained in the area portion 35 at every position to which the area portion 35 is moved as a pixel value of a central pixel of the area portion 35.

Next, the sensing action selection unit 33 selects a position largest in information amount (position at which a total value of average pixel values within an imaging range of the sensor 4 is largest) as the position at which the sensor 4 performs sensing in the current cycle, that is, the setting at of sensing in the current cycle ($a_{t+1}$, $a_{t+2}$, or the like in each of second and following cycles), and controls the actuator 5 of the information acquisition module 2 in such a manner that the sensor 4 performs sensing at the selected setting $a_t$ (S43).

Subsequently, processing in Steps S21 to S28 of FIG. 8 is similarly executed to Steps S2 to S9 of the sensing control processing according to the first embodiment described above with reference to FIG. 4. Collection of necessary information for recognizing the object to be sensed at each time is thereby repeatedly executed.

Furthermore, upon completion of recognition of the object to be sensed and registration of recognition results in the observation data management table 9 (FIG. 3) (S29), then the past observation data is reset (S30) similarly to Step S11 of FIG. 4, the processing then returns to Step S20, and the processing in and after Step S20 is similarly repeated.

The information processing program 30 according to the present embodiment described so far selects the position largest in information amount as the setting $a_t$ of sensing at the next cycle on the basis of the sensor data obtained by enlarging the visual field at a time of selecting a new object to be sensed. Therefore, it is possible to efficiently collect information about each object to be sensed and improve the processing efficiency of the character recognition processing.

(3) Third Embodiment

In FIG. 1, 40 denotes an information processing system according to a third embodiment as a whole. This information processing program 40 is configured similarly to the information processing system 1 according to the first embodiment except that a sensing action selection unit 43 in a calculation program 42 of an information processing program 41 selects the setting $a_t$ of sensing at the next cycle on the basis of image data (sensor data) in a central visual field and that in a peripheral visual field within an image based on the sensor data applied from the information acquisition module 2, and that a processing content of a generative model selection unit 44 differs from that according to the first embodiment at the time of acquiring the observation data $s_t$. It is noted that the "central visual field" refers herein to an area portion in a range of, for example, approximately ten vertical pixels and approximately ten horizontal pixels from a center of the image, and that the "peripheral visual field" refers herein to an area portion in a visual field other than the central visual field.

Figure 11:
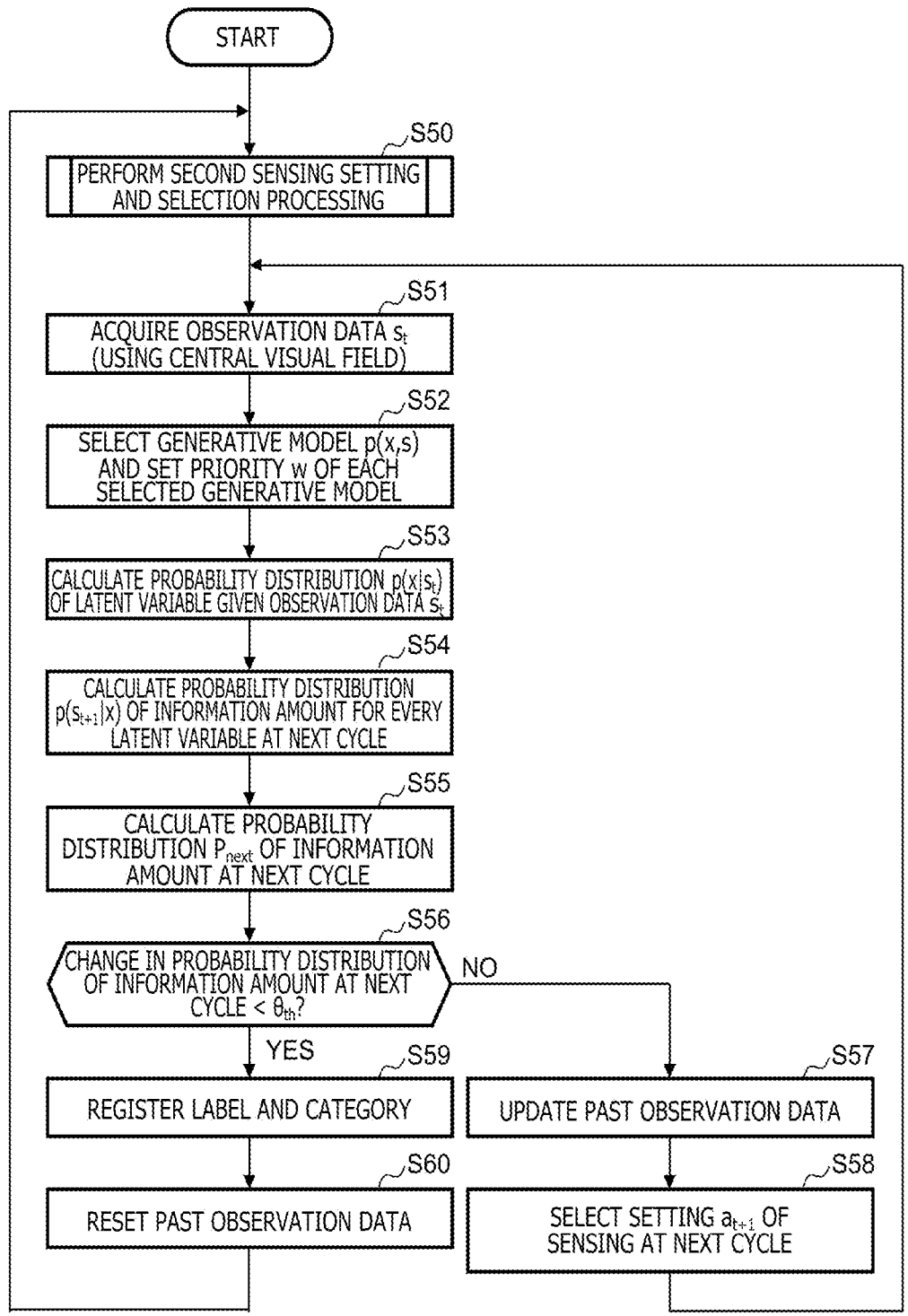
FIG. 11 is a flowchart depicting processing procedures of sensing control processing according to the third embodiment.

FIG. 11 depicts a flow of a series of sensing control processing executed in the information processing apparatus 41 according to the present embodiment. The information processing program 41 according to the present embodiment sequentially makes settings of sensing to the sensor 4 of the information acquisition module 2 according to processing procedures depicted in this FIG. 11.

In actuality, this sensing control processing is started upon startup of the information processing apparatus 41, and the sensing action selection unit 43 first executes second sensing setting and selection processing for selecting the setting $a_t$ of sensing in the current cycle (S50).

FIG. 12 depicts a specific processing content of this second sensing setting and selection processing. When this second sensing setting and selection processing is started, the sensing action selection unit 43 first selects the initial setting $a$ pre of sensing at random similarly to Step S1 of FIG. 4, and controls the actuator 5 of the information acquisition module 2 in such a manner that the sensor 4 performs sensing at the selected initial setting $a$ pre (S70).

Subsequently, the sensing action selection unit 43 waits for sensor data (image data) acquired by the sensor 4 at the initial setting $a_{pre}$ described above to be applied to the sensing action selection unit 43 from the information acquisition module 2 (S71). Upon receiving the sensor data in the course of time, the sensing action selection unit 43 calculates an distribution of average pixel value in the peripheral visual field of an image based on the sensor data received at that time (S72).

Next, the sensing action selection unit 43 selects, based on the distribution of average pixel value calculated in Step S72, a position largest in information amount (position at which the total value of average pixel values within the imaging range of the sensor 4 is the largest) as the position at which the sensor 4 performs sensing in the current cycle, that is, the setting $a_t$ of sensing in the current cycle ($a_{t+1}$, $a_{t+2}$, or the like in each of second and following cycles) (S73). Furthermore, the sensing action selection unit 43 then calls the generative model selection unit 44.

Upon being called by the sensing action selection unit 43, the generative model selection unit 44 acquires data obtained by compounding data obtained by compounding previously acquired pieces of sensor data (hereinafter, referred to as "past observation data $s_{t-1}$") with sensor data about a central visual field portion of the image based on the sensor data applied from the information acquisition module 2 and acquired in Step S70 as the observation data $s_t$ in the current cycle (S51).

Furthermore, subsequently, processing in Steps S52 to S58 of FIG. 11 is similarly executed to Steps S3 to S9 of the sensing control processing according to the first embodiment described above with reference to FIG. 4. Collection of necessary information for recognizing the object to be sensed at each time is thereby repeatedly executed.

Moreover, upon completion of recognition of the object to be sensed and registration of recognition results in the observation data management table 9 (FIG. 3) (S59), then the past observation data is reset (S60) similarly to Step S11 of FIG. 4, the processing then returns to Step S50, and the processing in and after Step S50 is similarly repeated.

The information processing program 40 according to the present embodiment described so far selects the position largest in information amount as the setting $a_t$ of sensing a t the next cycle in the peripheral visual field of the image based on the sensor data from the information acquisition module 2 at the time of selecting a new object to be sensed. Therefore, it is possible to efficiently collect information about each object to be sensed and improve the processing efficiency of the character recognition processing.

Furthermore, the present information processing system 40 processes the first Step S51 using the sensor data acquired in Step S50. It is, therefore, unnecessary to wait for sensor data other than the sensor data acquired in Step S50 to be applied from the information acquisition module 2 in the first Step S51. According to the present information processing system 40, therefore, it is possible to collect the information about each object to be sensed more highly efficiently, correspondingly and improve the processing efficiency of the character recognition processing.

The present invention can be widely applied to information processing apparatuses of various configurations for controlling active sensing.

What is claimed is:

1. An information processing apparatus for controlling active sensing using a sensor, comprising:
   a storage device that stores therein a learning model corresponding to each of a plurality of categories and obtained by learning, and the categories to each of which a previously recognized object to be sensed belongs;
   a model processor configured to select one or a plurality of the learning models from among the learning models stored in the storage device;
   an observation data latent variable analyzer configured to calculate a probability distribution of a latent variable given observation data obtained by sequentially compounding pieces of sensor data applied from the sensor, the probability distribution of the latent variable being output from each of the learning models selected by the model processor when the observation data is input to each of the learning models;
   an observation data information amount analyzer configured to calculate a probability distribution of an information amount owned by the observation data at a next cycle on a basis of the probability distribution of the latent variable of the observation data calculated by the observation data latent variable analyzer and the observation data; and a sensing action processor configured to select a setting of sensing at the next cycle on a basis of the probability distribution of the information amount owned by the observation data, the probability distribution of the information amount being calculated by the observation data information amount analyzer, wherein the model processor selects the learning model corresponding to the category estimated as the category to which a current object to be sensed belongs with a highest probability on a basis of the categories to each of which the previously recognized object to be sensed stored in the storage device belongs; and wherein the model selection processor selects the learning models corresponding to a predetermined number of top categories high in total number of objects to be sensed belonging to each of the categories, among the categories to each of which the previously recognized object to be sensed belongs.

2. The information processing device according to claim 1, wherein the model processor sets a priority of each of the selected learning models according to the total number of the objects to be sensed belonging to each of the categories to each of which the previously recognized object to be sensed belongs, the observation data latent variable analyzer multiplies the probability distribution of the latent variable of the observation data output from each of the learning models selected by the model processor when the observation data is input to each of the learning models, by the corresponding priority to combine the probability distribution of the latent variable with the priority, and the observation data information amount analyzer calculates the probability distribution of the information amount owned by the observation data at the next cycle on a basis of the probability distribution of the latent variable of the observation data combined with the priority and the observation data.

3. The information processing apparatus according to claim 2, wherein the model processor sets the priority of each of the learning models according to proportions of total numbers of the objects to be sensed belonging to each of the categories to each of which the previously recognized object to be sensed belongs.

4. The information processing apparatus according to claim 1, wherein the sensing action processor selects a setting of the sensing at the next cycle largest in information amount as the setting of sensing at the next cycle on a basis of the probability distribution of the information amount owned by the observation data at the next cycle, the probability distribution of the information amount being calculated by the observation data information amount analyzer.

5. The information processing apparatus according to claim 1, wherein the sensor is a camera, the setting of sensing is a position at which the sensor performs imaging, and the sensing action processor calculates an distribution of average pixel value within an image based on the sensor data obtained by enlarging a visual field, and determines an area portion largest in information amount as an initial value of the next setting of sensing on a basis of the calculated distribution of average pixel value.

6. The information processing apparatus according to claim 1, wherein the sensor is a camera, the setting of sensing is a position at which the sensor performs imaging, and the sensing action processor calculates an distribution of average pixel value in a peripheral visual field within an image based on the sensor data applied from the sensor, and determines a position largest in information amount in the peripheral visual field as an initial value of the next setting of sensing on a basis of the calculated distribution of average pixel value.

7. An information processing method executed by an information processing apparatus for controlling active sensing using a sensor, the information processing apparatus including a storage device that stores therein a learning model corresponding to each of a plurality of categories and obtained by learning, and the categories to each of which a previously recognized object to be sensed belongs, the information processing method comprising:

a first step of selecting one or a plurality of learning models from among the learning models stored in the storage device;

a second step of calculating a probability distribution of a latent variable given observation data obtained by sequentially compounding pieces of sensor data applied from the sensor, the probability distribution of the latent variable being output from each of the selected learning models when the observation data is input to each of the learning models;

a third step of calculating a probability distribution of an information amount inherent in the observation data at a next cycle on a basis of the calculated probability distribution of the latent variable of the observation data and the observation data; and a fourth step of selecting a setting of sensing at the next cycle on a basis of the calculated probability distribution of the information amount owned by the observation data, wherein the first step includes selecting the learning model corresponding to the category estimated as the category to which a current object to be sensed belongs with a highest probability on a basis of the categories to each of which the previously recognized object to be sensed stored in the storage device belongs; and wherein the first step includes selecting the learning models corresponding to a predetermined number of top categories high in total number of objects to be sensed belonging to each of the categories, among the categories to each of which the previously recognized object to be sensed belongs.

8. The information processing method according to claim 7, wherein
the first step includes
setting a priority of each of the selected learning models according to the total number of the objects to be sensed belonging to each of the categories to which the previously recognized object to be sensed belongs,
the second step includes
multiplying the probability distribution of the latent variable of the observation data output from each of the learning models when the observation data is input to each of the selected learning models by the corresponding priority to combine the probability distribution of the latent variable with the priority, and
the third step includes
calculating the probability distribution of the information amount owned by the observation data at the next cycle on a basis of the probability distribution of the latent variable of the observation data combined with the priority and the observation data.

9. The information processing method according to claim 8, wherein the first step includes
setting the priority of each of the learning models according to proportions of total numbers of the objects to be sensed belonging to each of the categories to each of which the previously recognized object to be sensed belongs.

10. The information processing method according to claim 7, wherein
the fourth step includes selecting a setting of the sensing at the next cycle largest in information amount as the setting of sensing at the next cycle on a basis of the calculated probability distribution of the information amount owned by the observation data at the next cycle.

11. The information processing method according to claim 7, wherein
the sensor is a camera,
the setting of sensing is a position at which the sensor performs imaging, and
the fourth step includes
calculating an distribution of average pixel value within an image based on the sensor data obtained by enlarging a visual field, and
determining an area portion largest in information amount as an initial value of the next setting of sensing on a basis of the calculated distribution of average pixel value.

12. The information processing method according to claim 7, wherein
the sensor is a camera,
the setting of sensing is a position at which the sensor performs imaging, and
the fourth step includes
calculating an distribution of average pixel value in a peripheral visual field within an image based on the sensor data applied from the sensor, and
determining a position largest in information amount in the peripheral visual field as an initial value of the next setting of sensing on a basis of the calculated distribution of average pixel value.

* * * * *